United States Patent [19]

Orieux et al.

[11] Patent Number: 4,480,322

[45] Date of Patent: Oct. 30, 1984

[54] PASSIVE UNDERWATER RANGE MEASUREMENT ACOUSTIC SYSTEM

[75] Inventors: François Orieux; Jean Berthéas, both of Paris, France

[73] Assignee: Thomson CSF, Paris, France

[21] Appl. No.: 365,383

[22] Filed: Apr. 5, 1982

[30] Foreign Application Priority Data

Apr. 15, 1981 [FR] France ............... 81 07547

[51] Int. Cl.³ .................. G01S 3/80; G01S 5/18
[52] U.S. Cl. .................. 367/123; 367/125
[58] Field of Search .................. 367/123, 125

[56] References Cited

U.S. PATENT DOCUMENTS

3,978,445  8/1976  Gravett .................. 367/125
4,207,621  6/1980  Clearwaters et al. .................. 367/123
4,283,767  8/1981  Rountree .................. 367/125

Primary Examiner—Richard A. Farley
Attorney, Agent, or Firm—Cushman, Darby & Cushman

[57] ABSTRACT

A range measurement system for a submarine also having a passive monitoring system with a beam forming circuit, one beam of which may be selected by a signal $V_N$ from a tracking computer. Two assemblies of three hydrophones are located respectively on the port side and on the starboard side of the submarine. The signals supplied by these receivers are correlated with a beam signal $S_V$ of the passive monitoring system selected supplying the delays of these signals. A computer receiving these delay values supplies to the tracking computer the values of the bearing angle $\alpha$ and the distance D of the noise source.

9 Claims, 10 Drawing Figures

Figure 1:
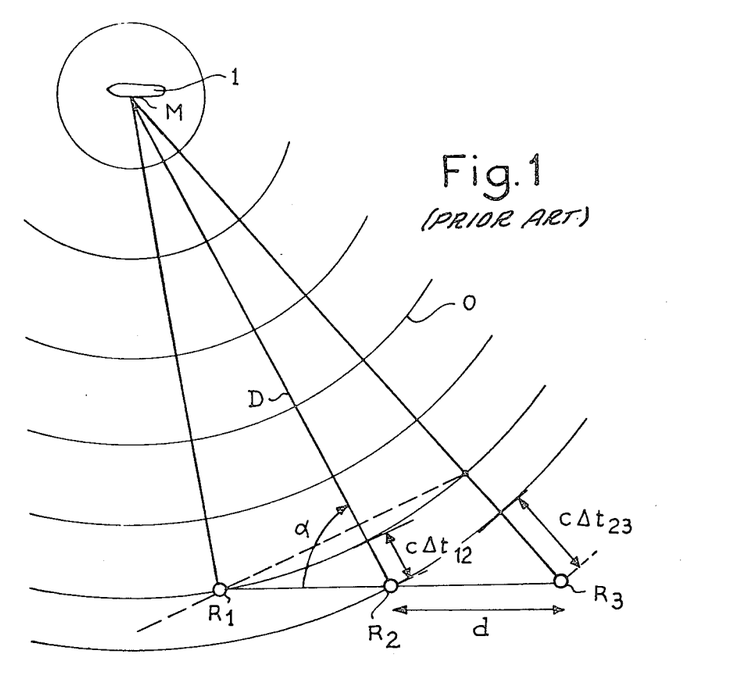
FIG. 1, the principle of a telemeter of the prior art.

-continued and $$D = \frac{d^2 \sin^2\alpha}{c\Delta t_{23} - c\Delta t_{12}} \quad (2)$$

where c is the speed of the waves.

Figure 2:
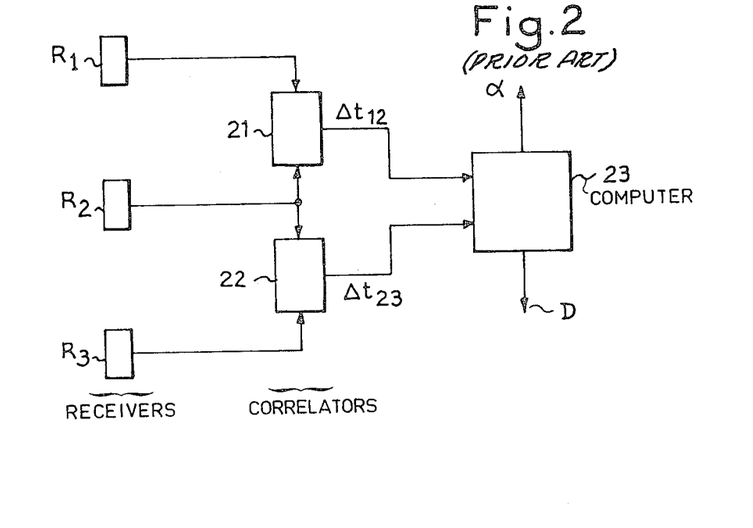
FIG. 2, the block diagram showing the processing circuits of the prior art.

To calculate the values of $\alpha$ and D, FIG. 2, two circuits 21 and 22 are used each comprising a correlator and a circuit for measuring the time, corresponding to the maximum of the intercorrelation signal. Thus, the first circuit 21 receives the signals from receivers $R_1$ and $R_2$ and supplies the delay time $\Delta t_{12}$. The second circuit 22 receives the signals from receivers $R_2$ and $R_3$ and supplies the delay time $\Delta t_{23}$. The values of $\Delta t_{12}$ and $\Delta t_{23}$ are applied to the computing circuit 23 which supplies, according to the relationships (1) and (2), the values of $\alpha$ and D.

The errors with respect to angle $\alpha$ and distance D depend on the error $\delta t$ obtained from the measurement of the time position of each intercorrelation maximum.

The error $\delta t$ obtained with respect to the maxima of the intercorrelation functions depends on the band $\Delta F$ and on the following signal to noise ratio S/N:

$$t = K/F\sqrt{S/N} \text{ with K close to } 0.5 \quad (3)$$

In underwater acoustics, this noise depends in particular on the state of the sea, on the sea traffic and on the noise proper to the carrier.

To reduce the noise with respect to omnidirectional receivers it is known to replace each of the receivers $R_1$, $R_2$ and $R_3$ by a hydrophone array, followed by a beam forming unit. The correlation is effected between the beams formed for the same angular sector, for each of the hydrophone arrays.

It is known that, in this case, the improvement of the signal to noise ratio is due to the fact that the noise to be considered is that of the angular width of a beam. The signal to noise ratio is thus increased by the "antenna gain".

In accordance with the invention, three simple receivers are used, whose signals are correlated with a beam signal from the existing passive monitoring system on the submarine.

For the passive monitoring system, several directional beams are formed from one array, so as to obtain panoramic bearing monitoring (angle in a plane parallel to the surface of the sea) in several adjacent angular sectors. To each directional beam there corresponds a beam signal.

A beam signal is used (taken as reference) supplied by the passive monitoring system, for correlating it with the three signals received by the three receivers, forming the telemetry base. The arrival time differences $\Delta t_{12}$ and $\Delta t_{23}$ are computed from the time positions $\tau_1$, $\tau_2$, $\tau_3$ of the maxima of the three intercorrelation functions by the relationships:

$$\Delta t_{12} = \tau_1 - \tau_2 \text{ and } \Delta t_{23} = \tau_2 - \tau_3 \quad (4) \text{ and } (5)$$

If we consider the intercorrelation of two signals whose signal to noise ratios differ by K decibels, the resulting signal to noise ratio at the intercorrelation output is increased by K/2 decibels.

Thus, the S/N ratio at the intercorrelation level is improved because the beam signal benefits from the gain of the passive monitoring system. In addition, the telemetry is improved in the presence of several noise sources.

Figure 3:
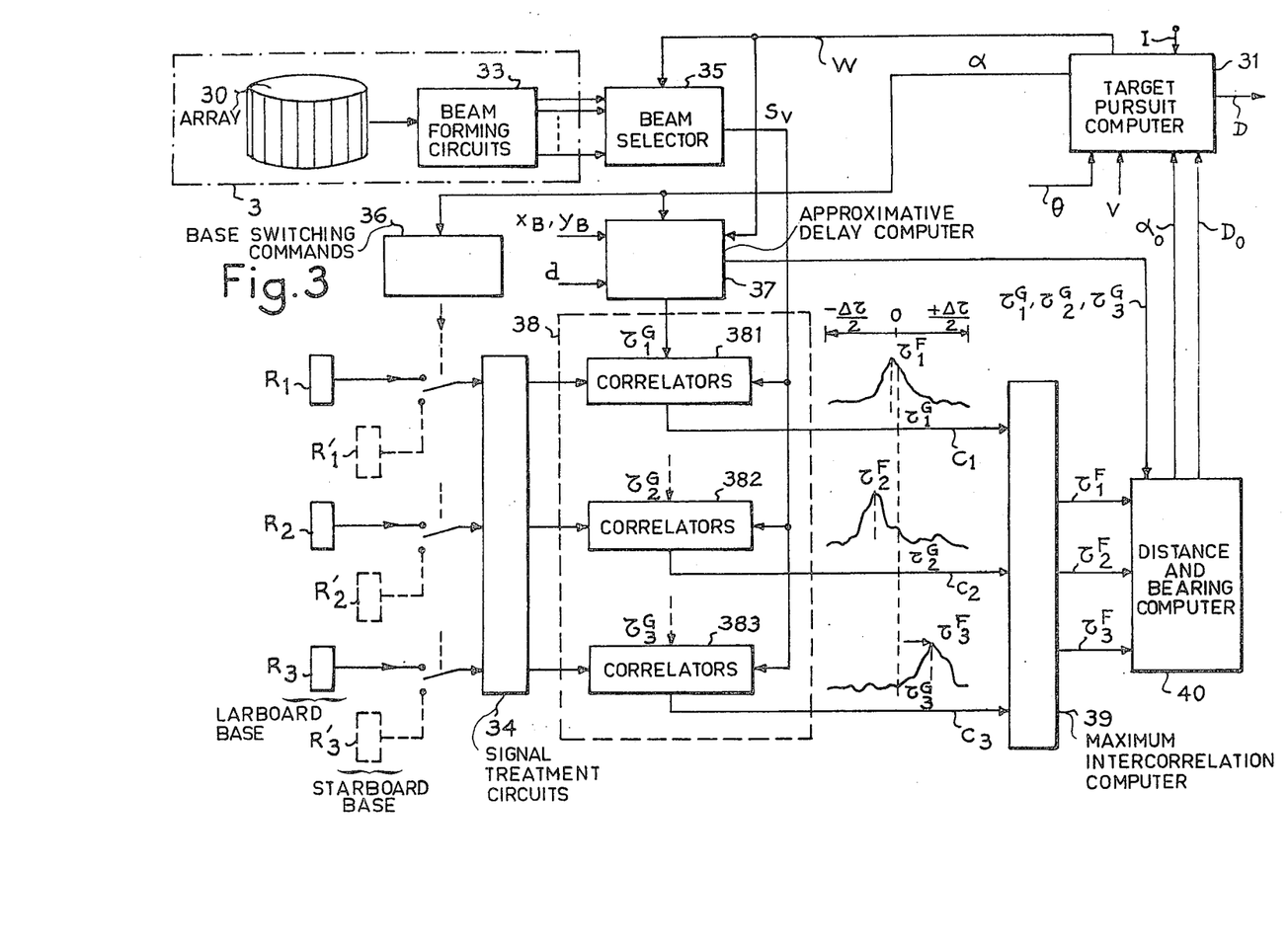
FIG. 3, the block diagram showing the system in accordance with the invention.

FIG. 3 shows schematically the passive system in accordance with the invention.

Figure 4:
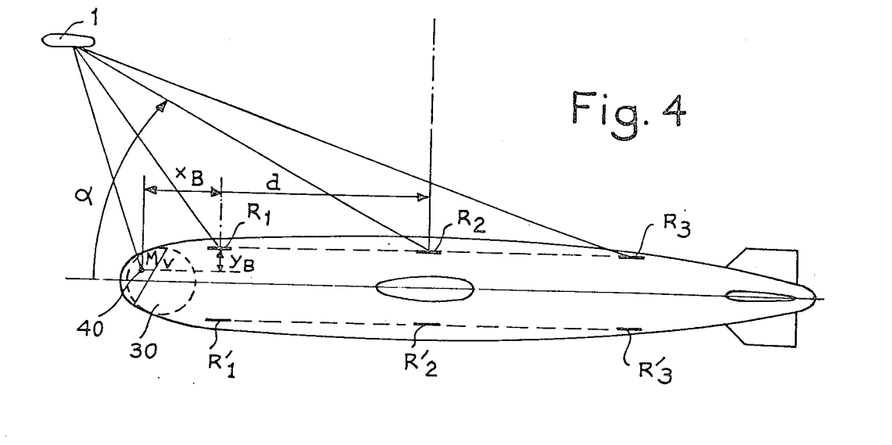
FIG. 4 implantation in a submarine of this telemetry system.

This system is for example mounted on a submarine as shown in FIG. 4. Two bases of three aligned receivers $R'_1$, $R'_2$, $R'_3$ and $R_1$, $R_2$, $R_3$ are mounted on each side, on the port side and on the starboard side, over a maximum length so as to obtain as great a length as possible for each telemetry base; their alignment is parallel to the axis of the carrier submarine and the angle $\alpha$ is the bearing. If the receivers are equidistant, the length of each base is equal to 2d.

In FIG. 4, there is shown a passive monitoring antenna 30, cylindrical in shape and situated at the front of the submarine.

Telemetry systems in general allow tracking of one or several targets. A tracking computer 31 supplies operating data required by the operator (FIG. 3). This tracking computer 31 receives the information relative to the course $\theta$ and speed V of the submarine.

In accordance with the invention, the passive acoustic system properly speaking is used in combination with the passive monitoring system. This latter is shown by the assembly 3 and comprises principally the panoramic array 30, for example cylindrical, and the beam formation circuits 33.

The signals received by the three receivers $R_1$, $R_2$ and $R_3$ of the starboard side telemetry base or $R'_1$, $R'_2$ and $R'_3$ of the port side telemetry base are amplified, filtered in the monitoring band of the passive monitoring system and regulated by automatic gain control (AGC) in the pre-processing unit 34.

A circuit 35 for selecting a beam signal $S_\nu$ among all the beam signals of the passive monitoring system is connected to the output of the beam formation circuits 33. This circuit 35 receives from the tracking computer a beam address W determined from the bearing of the target tracked.

The bearing $\alpha$ of the target is supplied by the tracking computer 31 to a circuit 36 which controls the choice of one of the two telemetry bases, port side or starboard side, depending on the value of $\alpha$.

The value of bearing $\alpha$ is also supplied to a circuit 37 which computes the so-called "coarse" delays $\tau_1^G$, $\tau_2^G$, $\tau_3^G$ from the value of the bearing angle $\alpha$ and from the geometrical data of the transducers. These delays estimate roughly the delays between the beam signal $S_\nu$ for the direction $\alpha$ and the three receivers of the base.

The formation of the angular beams is obtained by processing the N signals received by N columns, among the M columns forming the antenna, with $N < M$.

Delay lines are operable for cancelling out, for a bearing angle $\alpha$, the delays of these N signals with respect to a reference point $M_\nu$ (FIG. 4). This point $M_\nu$ varies for the different beams formed.

If $x_B$ and $y_B$ are the projections of the vector $M_\nu R_1$ along axes x and y, where the axis x is parallel to the axis of the submarine and axis y perpendicular to axis x and horizontal, and with reference to FIG. 4, the delay $\tau_1^G$ between the signals received at $R_1$ and $M_\nu$ is equal to $(x/c)_B \cos \alpha + (y/c)_B \sin \alpha$, where c is the speed of sound in water.

The values $x_B$ and $y_B$ also depend on the angle $\alpha \cdot \tau_2^G$ and $\tau_3^G$ are given by the relationships:

$$\tau_2^G = \tau_1^G + (d/c) \cos \alpha \text{ and } \tau_3^G = \tau_2^G + (d/c) \cos \alpha$$

PASSIVE UNDERWATER RANGE MEASUREMENT ACOUSTIC SYSTEM

BACKGROUND OF THE INVENTION

The present invention is a passive acoustic system for supplying the direction and the distance of a source, called noise emitter, emitting sound signals. These systems are principally used by submarines for, after detecting one or several noise emitters, following same. This information is then used for controlling a weapons system.

Determining the direction and the distance of a noise emitter is known, using three aligned generally equidistant receivers.

The signals received by the end receivers are each applied to a correlation circuit which further receives the signal from the central receiver. The two intercorrelation signals each pass through a time maximum which supplies the algebraic value of the delay of the two signals received by the end receivers with respect to the signal received by the central receiver.

A computing circuit determines from these delay values the direction and distance of the noise source.

The accuracy obtained for the parameters measured depends on the ratio of the signal emitted by a noise source, in a certain frequency band, and the power of the noise, other than the useful signal, in this same frequency band. This ratio is called signal to noise ratio.

It is known, that to increase the signal to noise ratio (S/N) in passive acoustic systems, to use as receivers an array of transducers or hydrophones. The S/N ratio at the output of the sound transducers is thus increased by the gain with respect to the S/N ratio at the input of each hydrophone.

For example, in certain commercially available systems, each receiver array is formed of several columns of several hydrophones. On each side of the submarine are also disposed three arrays covering two angular sectors of 120°, on the port side and on the starboard side. Each array allows several directional beams to be formed.

In submarines equipped with a passive system, in the prior art, there is generally provided in addition a passive monitoring system. The passive monitoring signals are processed so as to preform beams of an angular width of a few degrees and it is the passive monitoring system which supplies in this case the direction of the noise source.

The need to preform beams both for the telemetry system and for the passive monitoring system presents the drawback of being of great complexity.

The system in accordance with the invention remedies this disadvantage because it does not comprise formation of beams signals supplied by the receivers of the passive acoustic range measurement system. The reduction of the noise ratio which results therefrom is compensated for, at least partially, in accordance with the invention, by using in combination signals from these receivers and those supplied by the passive monitoring system, using the preformed directional path information of a passive monitoring system.

SUMMARY OF THE INVENTION

Briefly, it is a passive acoustic system used more especially in under water acoustics on board submarines fitted with a passive monitoring system having preformed directional beams comprising at least three aligned receivers $R_1$, $R_2$, $R_3$, means for measuring the arrival time differences of a signal produced by at least one noise source situated in a direction of angle $\alpha$ and at a distance D between the receivers $R_1$, $R_2$, and $R_2$, $R_3$, i.e. respectively $\Delta t_{12}$ and $\Delta t_{23}$, means for computing the direction $\alpha$ and the distance D from these time differences, means for ensuring the tracking of one or several noise sources, wherein the time differences $\Delta t_{12}$ and $\Delta t_{23}$ are obtained by measuring the delays $\tau_1$, $\tau_2$, $\tau_3$ between the beam signal from the passive monitoring system corresponding to the directional beam the closest to that of the noise source and the signals from receiver $R_1$, receiver $R_2$ and receiver $R_3$ so that $\Delta t_{12} = \tau_1 - \tau_2$ and $\Delta t_{23} = \tau_2 - \tau_3$.

BRIEF DESCRIPTION OF THE DRAWINGS

Other characteristics and advantages will be clear from the following description, illustrated by the figures which represent.

DESCRIPTION OF THE PREFERRED EMBODIMENTS

Passive telemetry systems have existed for 50 years and are widely used in the under-water acoustics field. In the United States, for example, the Sperry firm developed in 1956 the manufacture of passive acoustic systems for submarines and called "micropuffs".

FIG. 1 shows an explanatory diagram of the operating principle. We will consider three aligned receivers, $R_1$, $R_2$ and $R_3$. Advantageously, these three receivers are spaced equally apart by d but their spacing may be unequal, and it is sufficient that the distances be known.

Let us take target 1 situated in a direction referenced by an angle $\alpha$, measured with respect to the alignment of the receivers, this target 1 forms a source of noise which radiated in all directions, and which is represented by a series of concentric circular waves such as O. With the direction considered, the wave front reaches receiver $R_1$ first, then receiver $R_2$ with a delay $\Delta t_{12}$ with respect to the time of arrival at $R_1$ and finally receiver $R_3$ with a delay $\Delta t_{23}$ with respect to the time of arrival at $R_2$.

This target 1 is considered as a point M and we assume that $|R_2M| = D$ and we call $\alpha$ the angle which the straight line $R_2M$ forms with the straight line $R_1R_2R_3$.

These arrival time differences at the receivers $\Delta t_{12}$, $\Delta t_{23}$ allow the direction referenced by $\alpha$ and the distance D to be obtained according to the following expressions obtained as a first approximation $$\alpha = \cos^{-1} \cdot \frac{c(\Delta t_{12} + \Delta t_{23})}{2d} \quad (1)$$

The system comprises an assembly 38 using the computation of the three intercorrelation functions between the beam signal $S_v$ and each of the three pre-processed signals coming from receivers $R_1$, $R_2$ and $R_3$ or $R'_1$, $R'_2$ and $R'_3$.

In FIG. 3 there is shown the assembly 38 comprising three correlation devices 381, 382, 383 receiving at one input the output signals from the pre-processing assembly 34 and at the other output the path signal $S_v$ selected by circuit 35. The values of the "coarse" delays $\tau_1^G$, $\tau_2^G$ and $\tau_3^G$ are introduced at the level of the correlators, so as to reset the signals about these delays. Thus, the intercorrelations are computed in a smaller delay range, $\pm\Delta\tau/2$, corresponding to the uncertainty with respect to angle $\alpha$ and with respect to the arrival angle of sight of the sound rays, the differences between $\tau_1^G$, $\tau_2^G$ and $\tau_3^G$ no longer playing a role.

The three intercorrelation functions $C_1$, $C_2$ and $C_3$ thus computed about the "coarse" delays, are fed to a circuit 39 for measuring "fine" delays $\tau_1^F$, $\tau_2^F$, $\tau_3^F$, of the signal at the three receivers $R_1$, $R_2$ and $R_3$ with respect to the beam signal $S_v$. This circuit 39 implements the search for the time position of the maximum of each intercorrelation function.

The delays $\tau_1$, $\tau_2$, $\tau_3$ of the signals received by the three receivers with respect to the beam signal $S_v$ are then given by $\tau_i = \tau_i^G + \tau_i^G$, where $i = 1,2,3$.

The arrival time differences at the three receivers $\Delta t_{12}$ and $\Delta t_{23}$ are given by the relationships (4) and (5).

Consequently, the computer 40 which receives the values of the "fine" delays and of the "coarse" delays carries out the computation of a bearing $\alpha_o$ and a distance $D_o$ in accordance with the expressions (1) and (2).

Several bearing $\alpha_o$ and distance $D_o$ values are then fed to the tracking computer 31. This computer carries out filtering and integration of the angle and distance data taking into account the course and the speed of the carrier, for example by using the algorithm of Kalman. It supplies in particular the bearing $\alpha$ of the noise source, calculated from several bearing values $\alpha_o$ and distance D from several values of $D_o$.

The operator initializes the tracking at I at the level of the tracking computer 31, from the indications from the passive monitoring system. Thus, for a noise source situated in a beam whose direction corresponds to $\alpha_V$, the operator feeds into tracking computer 31 this value $\alpha_V$ which constitutes the initial value of $\alpha$.

Passive monitoring systems generally have a large antenna gain so as to increase the output signal to noise ratio. In fact, considering their intended purpose, these systems must be sensitive.

It is known that if, to form a beam, a number N of receivers is used spaced apart by at least half a wavelength $\lambda/2$, corresponding to the central frequency of the monitoring band, the antenna gain is of the order of N.

According to the preceding considerations concerning the signal to noise ratio of the intercorrelation signal, it will be understood that the system of the invention allows the accuracy of the angle and direction measurements to be improved while benefiting from the antenna gain of the passive monitoring system.

Figure 5:
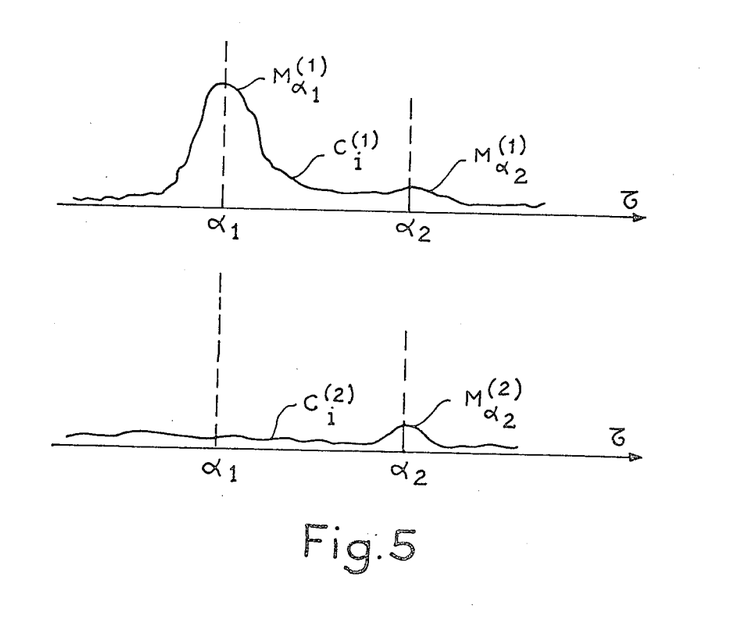
FIG. 5, correlation signals for two noise sources.

Moreover, the system of the invention allows the telemetry to be improved in the presence of several noise sources. In FIG. 5, there can be seen the intercorrelation function curve $C_f^{(1)}$ obtained with two not very directional receivers in the presence of two noise sources. They are received with very different levels $M_{\alpha 1}^{(1)}$ or $M_{\alpha 2}^{(1)}$ and their directions $\alpha_1$ and $\alpha_2$ are not separable by the directivity of the two receivers which is wide. It can be seen that the residual level of the intercorrelation maximum $M_{\alpha 1}^{(1)}$ relative to the stronger noise source masks the intercorrelation maximum of the weaker noise source $M_{\alpha 2}^{(1)}$.

On the other hand, in FIG. 5, there is also shown the intercorrelation function $C_f^{(2)}$ obtained with these same two noise source between a beam signal whose directivity has an angular width less than $|\alpha_1 - \alpha_2|$ and a receiver which is not very directional. It can be seen that the residual level of the intercorrelation maximum relative to the strongest noise source $M_{\alpha 1}^{(2)}$ is attenuated by the directivity function of the beam directed in direction $\alpha_2$, for improving the telemetry of the weakest noise source.

The passive monitoring antenna is, for example, a cylinder of the order of 2 meters in diameter, comprising on its periphery several tens of columns of equidistant hydrophones, placed in front of a reflector. A path is formed from 24 columns and the bearing antenna gain is of the order of 17 decibels.

Each telemetry receiver is formed, for example, from a single column of hydrophones placed in front of a reflector. Thus, a beam is obtained directional in the vertical plane whereas, for the bearing angle, the opening angle is of the order of 150°, which leads to a bearing antenna gain of about 3 decibels.

We then have K of the order of 14 decibels and according to the preceding teaching, the telemetry system proposed allows a signal to noise ratio at the level of the intercorrelations to be obtained greater by 7 dB than the signal to noise ratio which would be obtained with two receivers formed from a column of hydrophones placed in front of a reflector. To obtain an identical signal to noise ratio with a conventional telemetry system, each receiver must be an array whose bearing angle gain is 7 dB, which involves the use of several columns of hydrophones and formation of directional beams.

Figures 6, 6A:
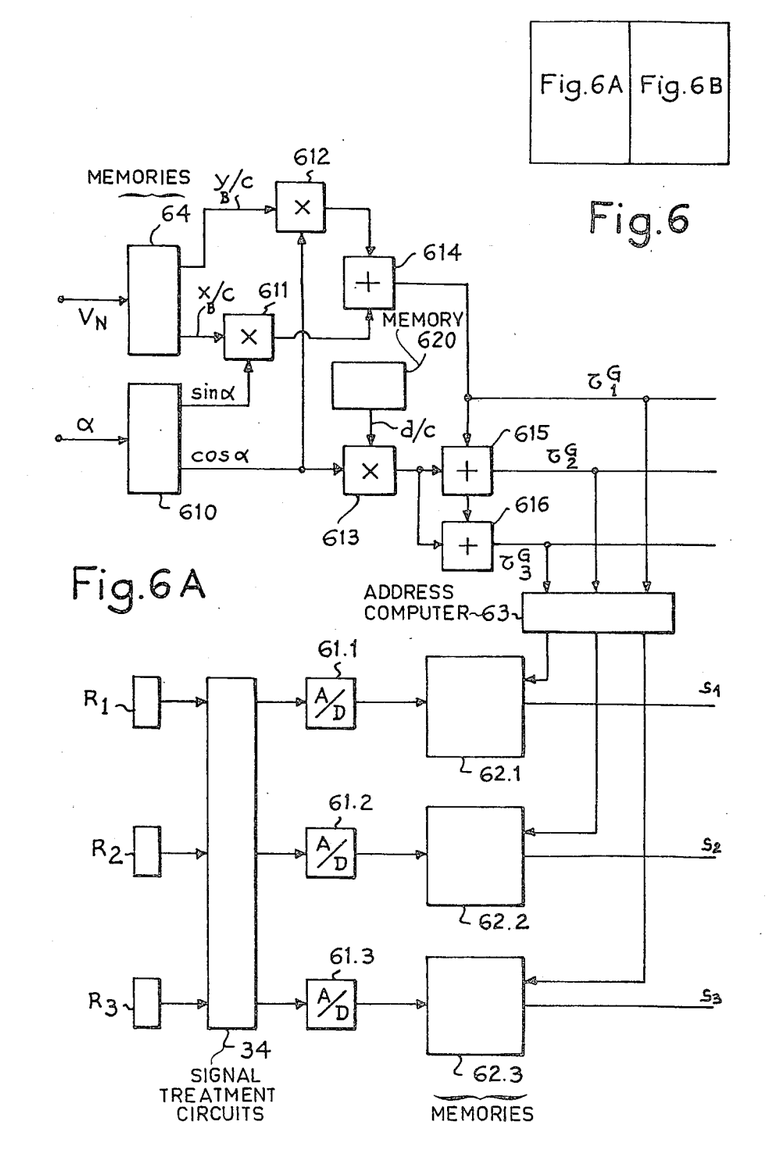
FIG. 6, the relative positions of FIGS. 6A and 6B.
FIGS. 6A and 6B, digital processing circuits for the system.
Figure 6B:
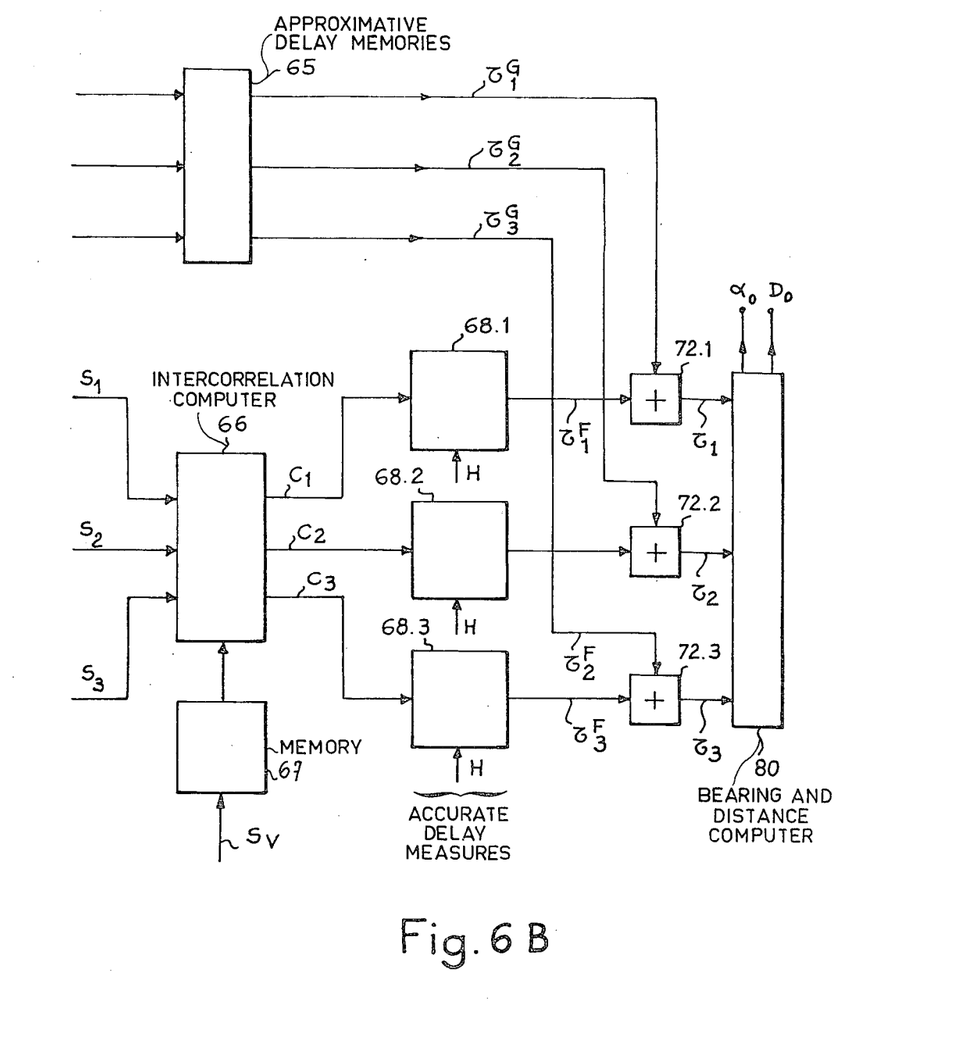

A preferred embodiment of the invention uses digital techniques. FIG. 6 shows one example of circuitry which uses the intercorrelations and the measurement of delays $\tau_1$, $\tau_2$, $\tau_3$.

The operation of the system is under the control of a clock signal H supplied by a generator (not shown) and it takes place in successive computing cycles, each cycle supplying a value of the direction and a value of the distance D of a tracked noise source. The computing cycle begins at the time when the address of the beam of the passive monitoring system W and the value of the angle $\alpha$ are supplied to the system by the tracking computer 31 of FIG. 3.

Since coordinates $x_B$ and $y_B$ depend on the path, they are stored in reduced form $(x/c)B$ and $(y/c)B$ in memory 64, the reading of which is controlled by the number of the beam W.

A circuit 610, for example, a programmed memory receiving the values of angle $\alpha$, supplies the values of sin $\alpha$ and cos $\alpha$, which are multiplied in the multiplying circuit 612 and 611 by $y_B/c$, $x_B/c$, then the partial results are added by a circuit 614 to give the coarse delay $\tau_1^G$. The delay $\tau_2^G$ is obtained by adder 615 by adding to $\tau_1^G$ the amount $(d/c) \cos \alpha$, then $\tau_3^G$ is obtained by adder 616 by adding to $\tau_2^G$ the same amount $(d/c) \cos \alpha$. The value $d/c$ is supplied by a memory 620. A multiplying circuit 613 receives the values of $d/c$ and cos $\alpha$.

The delays $\tau_1{}^G$, $\tau_2{}^G$, $\tau_3{}^G$ thus obtained are stored in a buffer memory 65.

Furthermore, the signals received by receivers $R_1$, $R_2$ and $R_3$ and pre-processed, are sampled by the analog-digital converters 61.1, 61.2 and 61.3 and stored in digital memories 62.1, 62.2 and 62.3. Further, the beam signal $S_V$ selected by circuit 35 is stored in a digital memory 67. It should be noted that in modern passive monitoring systems, the beam signals are already supplied in digital form. Each intercorrelation is computed over a signal time T which is large with respect to the maximum delay obtained in the most inclined direction.

The signals from the three receivers $S_1$, $S_2$ and $S_3$ are stored in memories such as 62.i over a period of time greater than T. Computation of the addresses of the samples read out from these memories is effected in circuit 63 which receives the values of the coarse delays $\tau_i{}^G$. This addressing allows the reading out from each memory of a signal portion $S_i$ of duration T, shifted with respect to the portion T of portion $S_V$ by the delay $\tau_i{}^G$.

Computer 66 carries out computation of the intercorrelation function between each signal $S_i$ and the signal $S_V$ over a delay range $\pm\Delta\tau/2$. At each shift $\tau$, it works out the product of the samples corresponding to the duration T and thus supplying a "point" of the intercorrelation function:

$$\sum_{t_o}^{t_o+T} S_V(t) \cdot S_i(t - \tau);$$

at moment $t_o$, t being the time.

Figure 7:
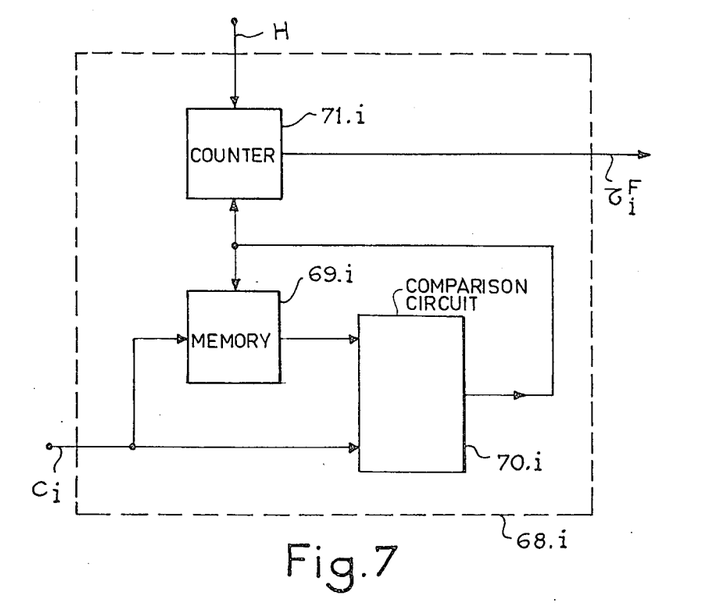
FIG. 7, a block diagram of the fine delay measurement circuit.

Every time that a point of the intercorrelation function is computed, it is fed to an assembly of circuits such as 68.i (FIG. 7) carrying out the measurement of the fine delay $\tau_i{}^G$. Each point is compared in a comparator 70.i with the point having the highest value at this time stored in a buffer memory 69.i. This buffer memory as well as a circuit 71.i for counting and totalizing the clock periods H are controlled by the result of the comparison. When all the points of a function have been computed, the totalizing counter 71.i supplies a quantified estimation of $\tau_i{}^F$. The $\tau$ quantification rate is equal to the time sampling rate of signals $S_V$ and $S_i$. The final value of $\tau_i{}^F$ is obtained by interpolation by using the samples of the intercorrelation function about the maximum found. The corresponding coarse delay $\tau_i{}^G$ is added to the fine delay $\tau_i{}^F$ in circuit 72.i, so as to supply the value of the delay $\tau_i$ which is fed to computer 80.

This embodiment is in no wise limiting. Thus, according to a preferred embodiment, computer 66 and the whole of circuitry 68.i form a single computer. In addition, depending on the number of memories, operators and input and output means, this computer may compute either sequentially or simultaneously the three delays $\tau_1$, $\tau_2$, $\tau_3$. Advantageously, this computer is a microprocessor circuit suitably programmed.

According to another embodiment, computer 66, the whole of circuitry 68.i and computer 80 are formed by a single microprocessor circuit.

Figure 8:
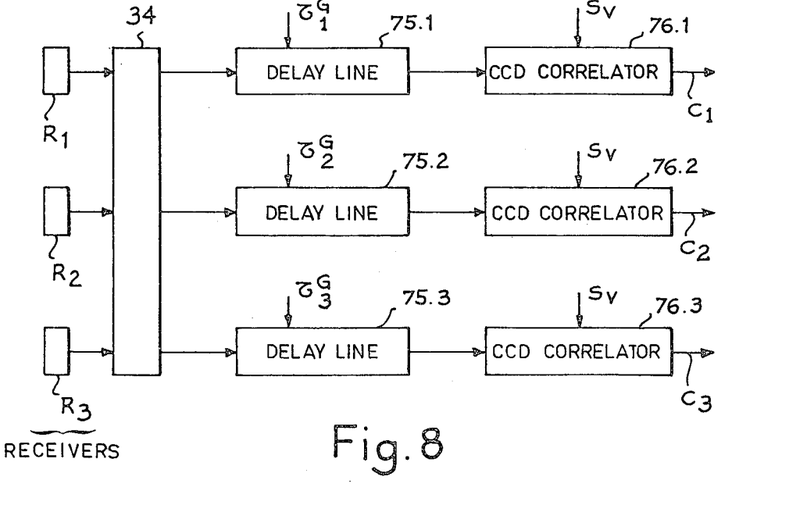
FIG. 8, a variation of the delay line processing circuitry and charge coupling device.

A variation of the embodiment of the invention is shown in FIG. 8, the signals from receivers $R_1$, $R_2$, $R_3$, pre-processed in circuits 34, are delayed analogically in tapped delay lines 75.1, 75.2 and 75.3, in which the choice of the output tapping is controlled from previously determined coarse delays $\tau_i{}^G$. Each signal $S_i$ suitably delayed is then correlated with the path signal $S_V$ in correlator constructed with charge transfer circuits 76.1, 76.2 and 76.3, whose operation is similar to a shift register and allowing a transverse filter to be formed whose tappings are weighted by the samples of signal $S_V$.

We claim:

1. An underwater acoustic system for submarines equipped with a passive monitoring system having preformed beams for detecting at least one noise source with bearing angle $\alpha$ and distance D comprising:
   at least three aligned receivers $R_1$, $R_2$ and $R_3$ receiving the signals produced by the noise sources,
   means for determining the delay $\Delta t_{12}$ of the signal received by the receiver $R_2$ with respect to that of receiver $R_1$, and the delay $\Delta t_{23}$ of the signal received by receiver $R_2$ with respect to that of receiver $R_3$, by measuring the delays $\tau_1$, $\tau_2$ and $\tau_3$ between the beam signal from the passive monitoring system corresponding to the beam whose direction is closest to that of the noise source and the signals from receivers $R_1$, $R_2$ and $R_3$ so that $\Delta t_{12} = \tau_1 - \tau_2$ and $\Delta_{23} = \tau_2 - \tau_3$,
   means for calculating from values $\Delta t_{12}$ and $\Delta t_{23}$ the values of $\alpha$ and of D,
   means for tracking one or more noise sources from the values of $\alpha$ and D.

2. The system as claimed in claim 1, wherein the delays $\tau_1$, $\tau_2$, $\tau_3$ are obtained by computing the three intercorrelation functions between the beam signal of the passive monitoring system and the three signals coming from the three receivers $R_1$, $R_2$ and $R_3$.

3. The system as claimed in claim 2, wherein said tracking means includes a tracking computer and a bearing and distance computer and one of the beams of the passive monitoring system is selected by a selection circuit controlled by the tracking computer, wherein said tracking computer receives the course and speed information for the submarine as well as several bearing $\alpha_o$ and distance $D_o$ values of the noise source, calculated by said bearing and distance computer receiving the delay values of the signals received by the receivers $R_1$, $R_2$ and $R_3$ with respect to the beam signal $S_V$ supplied by the passive monitoring system.

4. The system as claimed in claim 3, wherein the tracking computer supplies the value of bearing $\alpha$ and distance D as well as the signal W which is applied to said selection circuit, which receives the beam signals from the passive monitoring system and which selects one of the beam signals $S_V$ from the bearing angle $\alpha$ and wherein said determining means includes means for filtering the signals supplied by the receivers $R_1$, $R_2$ and $R_3$ and correlators further receiving the beam signal $S_V$ and supplying the intercorrelation functions applied to the calculating means.

5. The system as claimed in claim 3, wherein the submarine comprises two assemblies of three receivers, one on the port side and the other on the starboard side of the submarine, the selection of the two assemblies being controlled by the tracking computer.

6. The system as claimed in claim 3, wherein, from the values of the bearing angle $\alpha$ supplied by the tracking computer and the beam selection signal W are calculated coarse values $\tau_1{}^G$, $\tau_2{}^G$, $\tau_3{}^G$ of the delays of the signals received by the receivers $R_1$, $R_2$ and $R_3$, with respect to the selected beam signal W and wherein said tracking means including means for digitizing the signals supplied by the receivers $R_1$, $R_2$ and $R_3$, memory means for storing the digitized signals, circuit means controlling the reading out from said memories which receives the coarse delay values $\tau_1^G$, $\tau_2^G$ and $\tau_3^G$ a correlation computer for receiving the signals read out from said memories and further receiving the digitalized values of the path signal $S_v$ and means for computing, from the values of the intercorrelation functions, "fine" delays $\tau_1^F$, $\tau_2^F$, $\tau_3^F$ which, added to the coarse delays $\tau_1^G$, $\tau_2^G$, $\tau_3^G$ supply the delays which provide the values of the bearing angle $\alpha_o$ and of a distance $D_o$ of the noise source.

7. The system as claimed in claim 1, wherein intercorrelation signals between the signals received by the receivers $R_1$, $R_2$ and $R_3$ with a beam signal $S_v$ are obtained by means of charge coupling devices and by variable delay lines which further receive delay control signals from the beam signal and from the beam signal and from the bearing angle $\alpha$.

8. The system as claimed in claim 3, wherein the passive monitoring system comprises an array formed from several columns of hydrophones, the signals from these columns being applied to a beam formation circuit.

9. The system as claimed in claim 3, wherein the tracking computer supplies an intial value of the bearing angle equal to the bearing angle $\alpha_V$ of the beam in which the noise source is detected.

* * * * *